Dec. 25, 1951 H. JOHNSON 2,580,027

LINE-CONTACT SEMICONDUCTOR DEVICE

Filed Oct. 23, 1950

INVENTOR
HARWICK JOHNSON
BY H. W. [signature]
ATTORNEY

Patented Dec. 25, 1951 2,580,027

UNITED STATES PATENT OFFICE 2,580,027

LINE-CONTACT SEMICONDUCTOR DEVICE

Harwick Johnson, Princeton, N. J., assignor to Radio Corporation of America, a corporation of Delaware Application October 23, 1950, Serial No. 191,590

6 Claims. (Cl. 175—366)

This invention relates generally to semi-conductor devices suitable for use in amplifier, oscillator, modulator and the like circuits, and more particularly relates to a transistor of the type having a pair of line contact electrodes.

In the copending application to Pantchechnikoff, Serial No. 84,672, filed March 31, 1949, entitled "Semi-Conductor Devices" and assigned to the assignee of this application, there has been disclosed a semi-conductor device or transistor provided with a pair of line contact electrodes. These line contact electrodes may be used as the emitter and collector electrodes of the device respectively, while a third electrode, the base electrode, is in low-resistance contact with the semi-conducting body. The provision of line contact electrodes improves the geometry of the device and thereby the electric field configuration so that a larger number of the emitted charge carriers, which may be "holes" or electrons, can be collected. Preferably, the line contact electrodes consist each of a wire or filamentary conductor which is pressed into intimate contact with the semi-conducting body or crystal.

It is accordingly an object of the present invention to provide an improved line contact transistor.

A further object of the invention is to provide an improved semi-conductor device of the line contact type permitting larger currents to pass through the device and providing a larger power output than could be obtained with previously known line contact semi-conductor devices.

In accordance with the present invention, a semi-conductor device comprises two bodies of semi-conducting material each having a substantially flat surface which face each other. At least two filamentary conductors such as fine metallic wires preferably of circular cross-section are disposed between the flat surfaces of the bodies and are pressed against the bodies to provide intimate substantially linear and tangential contact between each of the wires and the two bodies. The wires preferably are arranged substantially parallel and closely adjacent to each other. An additional electrode which is the base electrode, is in low-resistance contact with another surface area of each of the bodies. These two base electrodes may be electrically connected to each other. The resulting device will have a larger current carrying capacity and a larger power output than previously known line contact semi-conductor devices.

Figure 1:
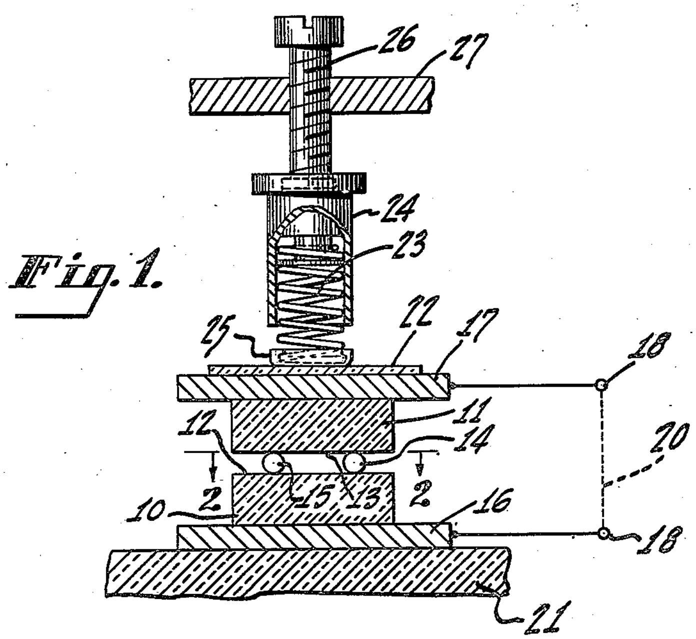
Figure 2:
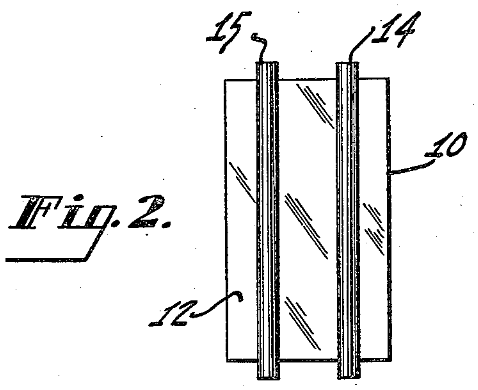

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a side view, partly in section, of a semi-conductor device embodying the present invention; and Figure 2 is a top plan view taken on line 2—2 of Figure 1 of the device of Figure 1.

Referring now to the drawing, in which like components have been designated by the same reference numerals throughout the figures, there is illustrated a semi-conductor device comprising a body or block 10 of semi-conducting material. Block 10 may, for example, consist of silicon or preferably of germanium which may be of the N type now well known in the art (see, for example, Rack 2,476,323). A second block 11 of the same material as block 10 is provided in accordance with the invention. The two blocks 10 and 11 preferably have plane surfaces 12 and 13 facing each other although the surfaces 12 and 13 may be curved as long as they are parallel to each other. Two wires 14 and 15 are disposed substantially parallel to each other and closely adjacent to each other between the plane surfaces 12 and 13 of blocks 10 and 11 respectively. Wires or conductors 14, 15 may be straight as illustrated or curved or even of circular shape as long as they are parallel to each other to form linear or curvilinear, that is, line contacts with blocks 10 and 11. Surfaces 12 and 13 may be ground or polished and etched as is conventional. Conductors 14 and 15 are pressed into intimate contact throughout a substantial length thereof with bodies 10 and 11 to provide a pair of line contact electrodes which may be the emitter and collector electrodes of the semi-conductor device.

Each of the blocks 10 and 11 is provided with a low-resistance electrode 16 and 17 respectively, which may be used as a base electrode. To this end suitable slabs of metal such as shown at 16 and 17 may be connected to the blocks 10 and 11 respectively, for example, by soldering or sweating thereto. Base electrodes 16 and 17 are connected to terminals 18 which may be effected by flexible wires soldered or otherwise electrically connected to metal slabs 16 and 17. Terminals 18 preferably are connected by conductor 20 to provide a single base electrode 16, 17.

As at present preferred the distance between the centers of conductors 14 and 15 may be approximately two mils or less, although a larger distance may be used if the device is specially electrically treated. Conductors 14 and 15 preferably have a diameter of between one half and one mil. Thus, conductors 14 and 15 may have a diameter of one mil and their centers may be spaced apart two mils so that the distance between the actual line contacts is two mils and the distance between the wires one mil. It is to be understood, however, that the line contacts formed by conductors 14, 15 may have a wider spacing than two mils.

The wire of which electrodes 14 and 15 consist may be made of tungsten, nickel, beryllium copper or the like. Preferably the conductors 14 and 15 consist of a metal which is softer than the semi-conducting blocks 10 and 11. If blocks 10 and 11 consist of germanium, which is a comparatively hard material, wires 14 and 15 may, for example, consist of tungsten which is softer than bodies 10 and 11, but not too soft so that the wires will not flatten under the application of pressure. It is important that the wires are pressed or forced into the microscopic irregularities of bodies 10 and 11 to provide intimate tangential contact therewith throughout a substantial portion of their length.

In order to provide intimate contact between each of the wires 14, 15 and the semi-conducting bodies 10 and 11, the two bodies are preferably pressed against each other. To this end metal slab 16 which is one of the base electrodes, may be mounted on an insulating support 21. Metal slab 17, the other base electrode, may be protected by an insulating sheet 22 against which a helical spring 23 presses. Spring 23 may be suitably guided in sleeve 24 and its free end may be provided with cap 25 pressing against insulating sheet 22. The spring pressure may be adjusted by a suitable thumb screw 26 threaded through fixed support 27. By the application of pressure, the two bodies 10 and 11 are pressed against wires 14 and 15. Accordingly, each of the wires 14 and 15 forms a line contact with both bodies 10 and 11, the two line contacts being disposed substantially parallel to each other.

The device illustrated in the drawing has a large current carrying capacity because the current which may flow, for example, from wire 14 to wire 15 will pass partly through body 10 and partly through body 11 both of which are semi-conductors. The base electrodes 16 and 17 may be provided in contact with any suitable surface area of bodies 10 and 11 provided they are in low-resistance contact with the bodies to determine the potential of the bulk of the crystals or bodies 10 or 11. It is also feasible to connect each base electrode 16 and 17 separately to an electrical circuit if desired. The device of the invention may be used in an amplifier, oscillator, modulator or the like circuit.

There has thus been disclosed an improved semi-conductor device of the type having a pair of line contact electrodes. The device has a larger current carrying capacity and a higher power output than previously known line contact semi-conductor devices.

What I claim is:

1. A semi-conductor device comprising two bodies of semi-conducting material, each having a surface, said surfaces facing each other, at least two filamentary conductors provided between said surfaces of said bodies, said conductors being disposed substantially parallel and closely adjacent to each other, each forming an electrode, an additional electrode in low-resistance contact with another surface area of each of said bodies, and means for providing intimate contact between each of said conductors and said bodies.

2. A semi-conductor device comprising two bodies of semi-conducting material, each having a substantially flat surface, said flat surfaces facing each other, a pair of filamentary conductors provided between said flat surfaces of said bodies, said conductors being disposed substantially parallel and closely adjacent to each other to form a pair of electrodes, an additional electrode in low-resistance contact with another surface area of each of said bodies, and means for pressing said bodies against said conductors to provide intimate contact between a substantial length of said conductors and said bodies.

3. A semi-conductor device comprising two bodies of semi-conducting material, each having a substantially flat surface, said flat surfaces facing each other, a pair of filamentary conductors provided between said flat surfaces of said bodies, said conductors being disposed substantially parallel and closely adjacent to each other to form a pair of electrodes, an additional electrode in low-resistance contact with another surface of each of said bodies, and means for providing intimate contact between each of said conductors and said bodies.

4. A semi-conductor device comprising two bodies of semi-conducting material, each having a substantially flat surface, said flat surfaces facing each other, a pair of filamentary conductors provided between said flat surfaces of said bodies, said conductors being disposed substantially parallel and closely adjacent to each other to form a pair of electrodes, an additional electrode in low-resistance contact with another surface of each of said bodies, and means for pressing said bodies against said conductors to provide intimate substantially line contact between said conductors and said bodies.

5. A semi-conductor device comprising a first body and a second body of germanium, a pair of filamentary conductors disposed substantially parallel and closely adjacent to each other between said bodies to form a pair of electrodes said conductors consisting of a metal substantially softer than germanium, an additional electrode in low-resistance contact with each of said bodies, and means for pressing said bodies against said pair of conductors to provide intimate substantially line contact between a major portion of the length of said conductors and said bodies.

6. A semi-conducotr device comprising a first block and a second block of germanium, a pair of filamentary conductors disposed substantially parallel and closely adjacent to each other between said blocks to form a first and a second electrode, said conductors consisting of a metal substantially softer than germanium, a third electrode in low-resistance contact with said first block, a fourth electrode in low-resistance contact with said second block, a conductor electrically connecting said third and fourth electrodes, and means for pressing said block against said pair of conductors to provide intimate substantially line contact between said pair of conductors and said blocks.

HARWICK JOHNSON.

REFERENCES CITED

The following references are of record in the file of this patent:

UNITED STATES PATENTS

| Number | Name | Date |
|---|---|---|
| 2,524,035 | Bardeen et al. | Oct. 3, 1950 |